US008738672B1

(12) United States Patent
Eshkenazi et al.

(10) Patent No.: US 8,738,672 B1
(45) Date of Patent: *May 27, 2014

(54) DOCUMENT MANAGEMENT SYSTEM USER INTERFACES

(75) Inventors: Nikolay B Eshkenazi, San Antonio, TX (US); Muqtadar Ahmed, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/401,577

(22) Filed: Feb. 21, 2012

Related U.S. Application Data

(63) Continuation of application No. 11/321,478, filed on Dec. 29, 2005, now Pat. No. 8,122,070.

(51) Int. Cl.
*G06F 17/30* (2006.01)
*G06F 21/31* (2013.01)

(52) U.S. Cl.
CPC .............................. *G06F 17/30203* (2013.01)
USPC ............................................ 707/827; 726/7

(58) Field of Classification Search
None
See application file for complete search history.

(56) References Cited

U.S. PATENT DOCUMENTS

| 5,918,217 | A | 6/1999 | Maggioncalda et al. |
| 6,289,382 | B1 | 9/2001 | Bowman-Amuah |
| 6,289,460 | B1 | 9/2001 | Hajmiragha |
| 6,308,179 | B1 | 10/2001 | Petersen et al. |
| 6,336,152 | B1 * | 1/2002 | Richman et al. ................. 710/8 |
| 6,640,249 | B1 | 10/2003 | Bowman-Amuah |
| 7,315,837 | B2 | 1/2008 | Sloan et al. |
| 7,328,325 | B1 | 2/2008 | Solis et al. |
| 7,383,463 | B2 | 6/2008 | Hayden et al. |
| 7,519,785 | B1 | 4/2009 | Schultz et al. |
| 2002/0156984 | A1 | 10/2002 | Padovano |
| 2003/0058277 | A1 | 3/2003 | Bowman-Amuah |
| 2003/0110106 | A1 | 6/2003 | Deshpande et al. |
| 2004/0133589 | A1 | 7/2004 | Kiessig et al. |
| 2004/0249794 | A1 | 12/2004 | Nelson et al. |
| 2004/0249902 | A1 | 12/2004 | Tadayon et al. |
| 2005/0144186 | A1 | 6/2005 | Hesselink et al. |
| 2005/0193245 | A1 | 9/2005 | Hayden et al. |
| 2005/0195660 | A1 | 9/2005 | Kavuri et al. |
| 2005/0223014 | A1 * | 10/2005 | Sharma et al. .................. 707/10 |
| 2006/0074788 | A1 | 4/2006 | Grizack et al. |
| 2006/0080432 | A1 | 4/2006 | Spataro et al. |
| 2006/0095419 | A1 * | 5/2006 | Anderson .......................... 707/3 |
| 2006/0168145 | A1 | 7/2006 | Pitts |
| 2006/0197971 | A1 | 9/2006 | Simpson et al. |
| 2006/0212746 | A1 | 9/2006 | Amegadzie et al. |
| 2007/0038697 | A1 | 2/2007 | Zimran et al. |
| 2007/0055703 | A1 | 3/2007 | Zimran et al. |
| 2007/0162434 | A1 | 7/2007 | Alessi et al. |
| 2007/0255822 | A1 | 11/2007 | Thiel et al. |
| 2007/0288693 | A1 | 12/2007 | Rajan et al. |

OTHER PUBLICATIONS

Tha Java CIFS Client Library, Dec. 4, 2000.*

(Continued)

*Primary Examiner* — Tarek Chbouki
(74) *Attorney, Agent, or Firm* — Baker and Hostetler LLP (57) ABSTRACT

Systems, methods, and software to provide document management system user interfaces to clients. Some embodiments include an intermediary server to provide document management system indexing data to a client in a form that is displayable within an existing client file browsing user interface, such as Windows Explorer.

20 Claims, 6 Drawing Sheets

(56) References Cited

OTHER PUBLICATIONS

Celentano, A., et al., "A multiple presentation document management system", Proceedings of the 10th Annual International Conference on Systems Documentation, Ottawa, ON,(1992), pp. 63-71.

Cockburn, A., et al., "3D or not 3D?: evaluating the effect of the third dimension in a document management system", Proceedings of the SIGCHI Conference on Human Factors in Comj2uting Systems, vol. 31 Seattle, WA,(Mar. 31-Apr. 5, 2001 ), pp. 434-441.

Dourish, P., et al., "Extending document management systems with user-specific active properties", ACM Transactions on Information Systems, 181 (Apr. 2000), pp. 140-170.

J.W. Long, et al., "Hopper File Management Tool," Nov. 17, 2005, Proceedings from the NECDC 2004, pp. 1-13.

Kim, H. L., et al., "Ontalk: ontology-based personal document management system", Proceedings of the 13th International World Wide Web Conference on Alternate Track Papers & Posters New York, NY,(May 17-22, 2004), pp. 420-421.

Kitagawa, H. ,et al., "Form document management system SPECDOQ—its architecture and implementation", Proceedings of the Second ACM-SIGOA Conference on Office Information Systems. (1984), pp. 132-142.

"Kovair's Document Management Solution", http://www.kovair.com/home/index.php?option=com_content&task=view&id=14&itemid=29, Kovair, Inc., (Accessed: Apr. 25, 2006),2 p.

The Java CIFS Client Library, http://jcifs.samba.org/. Dec. 4, 2000, pp. 1-13.

"Using My Computer," Windows XP Help File. ms-its:C:\WINDOWS\Help\howto.chm::/app_mycomputer.htm. Aug. 8, 2009. 1 pg.

U.S. Appl. No. 11/321,139, Non-Final Office Action mailed Jan. 9, 2008, 21 pgs.

U.S. Appl. No. 11/321,478, Non-Final Office Action mailed Dec. 31, 2007, 21 pgs.

* cited by examiner

DOCUMENT MANAGEMENT SYSTEM USER INTERFACES

CROSS REFERENCES

This application is related to U.S. application titled Document Management System User Interfaces Ser. No. 11/321,219 filed on even date herewith. This application is also related to U.S. application titled Document Management System User Interfaces Ser. No. 11/321,139 filed on even date herewith.

FIELD

The present subject matter relates to data processing and, more particularly, to a document management system user interfaces.

BACKGROUND

Document management systems are becoming increasingly more common across organizations of all sizes. Organizations are utilizing document management systems as a tool to store documents of many types. Commonly, a single employee can generate several documents a day. Further, some documents, such as invoices or periodic account statements, are generated by automated process in large numbers and stored in the organizational document management system. Thus, the number of stored documents increases over time.

Documents are generally stored by document management systems in a linear fashion as documents are generated. File names typically are concise and are not descriptive of a document to an extent to allow easy searches. Thus, although some document management systems may use a folder/directory structure that might provide partial insight about a document, the full details, are not apparent at the individual document level.

Document management solutions generally involves end-user training in the new user interface, terminology and functionality available in a document management system; it might also require a software to be installed (a "thick-client") on each of the users' boxes.

To organize documents, document management systems commonly include a database structure that stores metadata describing stored documents. To retrieve a document, a user generally utilizes a software component that must be loaded on the user's desktop. The user then utilizes that software component by entering data into a searching user interface regarding a needed document. This searching user interface of a document management system includes different fields in which to enter data descriptive of a document sought. After entering the information, a list of documents is retrieved and presented to the user in yet another user interface. However, the user may not have access to all of the documents displayed. Thus, document management systems, despite providing certain benefits, create additional support and training issues for organizations.

DETAILED DESCRIPTION

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limiting sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. The term "computer readable media" is also used to represent carrier waves on which the software is transmitted. Further, such functions correspond to modules, which are software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Various embodiments as described herein provide a user interface to a user of a document and record management system, such as Documentum available from EMC, Inc. of Hopkinton, Mass. In some such embodiments, such as the user interface example embodiment illustrated in FIG. 1, the user interface 100 provides the user a tree-view structure 102 from which to locate and access documents and records. This tree-view structure 102 allows the user to drill-down through the various levels of the tree-view structure to locate and access located documents and records. In some embodiments, documents can also be saved into the document management system using the user interface via a drag-and-drop action or a file save action of an application.

Figure 1:
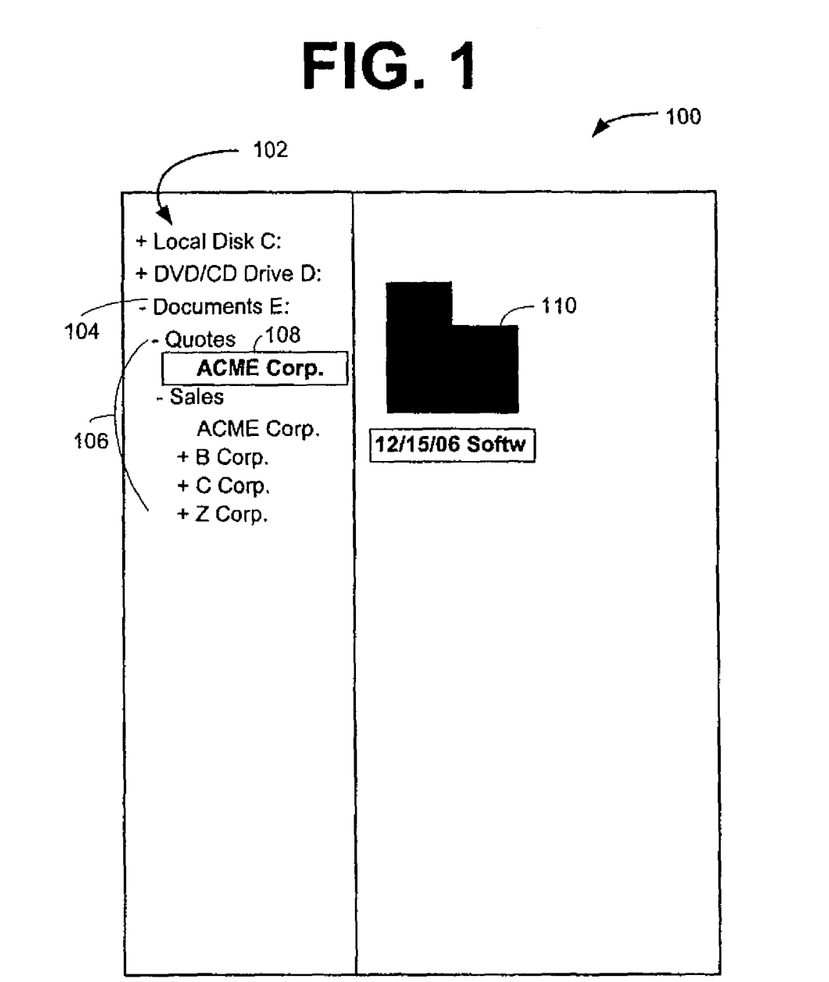
FIG. 1 is a user interface diagram according to an example embodiment.

In some embodiments, this tree-view structure 102 is integrated within an operating system user interface without the need for any specific software to be deployed to the client. For example, the tree-view structure 102, can be displayed within a drive/folder/file user interface such as the Windows Explorer user interface of the Microsoft Windows operating system family or a file save interface of an application. The highest level of the tree view can be displayed and represented as a drive or network storage location 104 and the lower levels can be displayed as folders 106 within the drive or network storage location representation. Selection of a folder, such as folder 108, causes files, such as file 110, to be displayed within the user interface 100. Selection of the file 110 causes the operating system to open the file and display it to the user. In some embodiments, only documents and records a user is allowed to access are provided to a user. In some other embodiments, the user is only allowed to open records in a "read-only" mode.

In some embodiments, documents can be saved to folders 106 within the user interface 100. Some embodiments allow documents to be added to folders 106 via a drag-and-drop action and via a file save action from within an application. In some such embodiments, when a document is added to a folder, such as folder 108, the document is saved to the document management system with the same properties that define the folder. For example, if all documents within a folder are read-only, a document added to that folder will be stored in the document management system as read-only.

Figure 2:
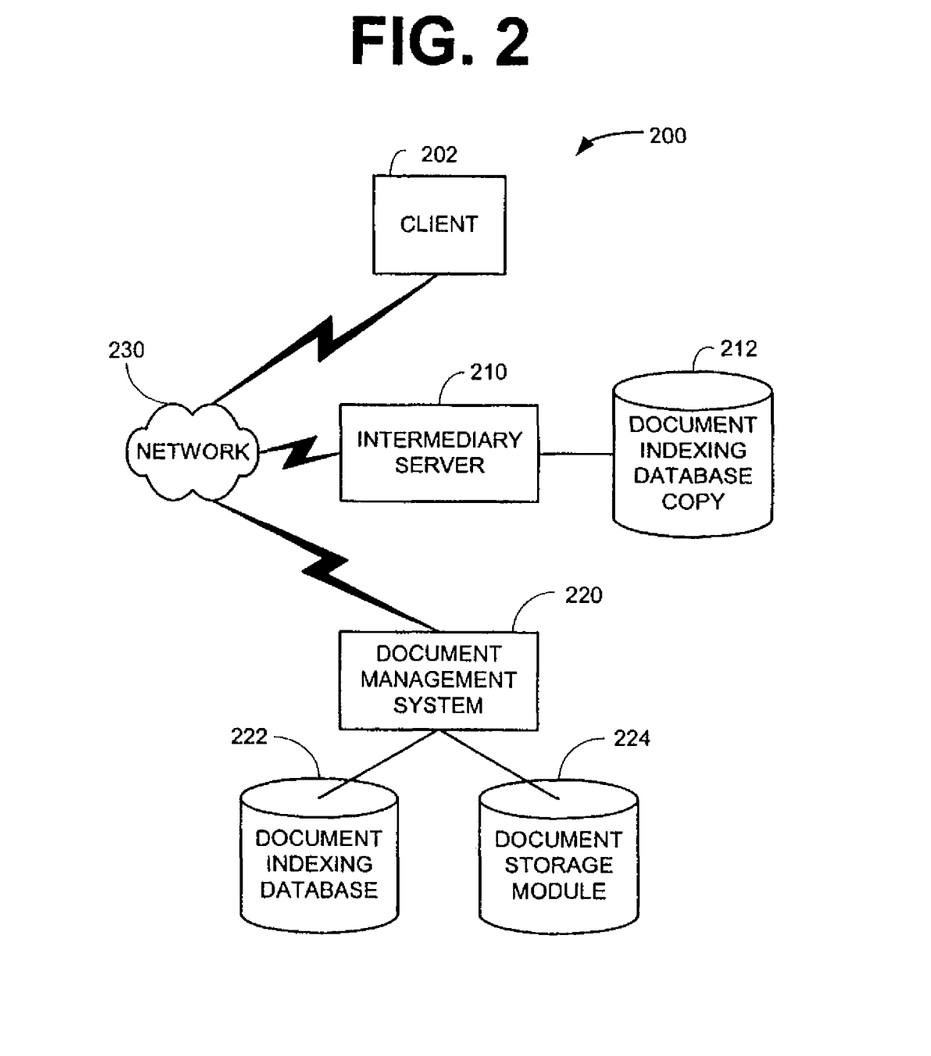
FIG. 2 is a schematic block diagram of a system according to an example embodiment.

FIG. 2 is a schematic block diagram of a system 200 according to an example embodiment. The example system 200 includes a client 202, an intermediary server 210, and a document management system 220 interconnected via a network 230.

One example client 202 is in the form of a computer. The client 202 includes an operating system that controls client 202 operation. The client 202 can include a processing unit, memory, removable storage, and non-removable storage. The memory can include volatile memory and non-volatile memory. The client 202 can include—or have access to a computing environment that includes—a variety of computer-readable media, such as volatile memory and non-volatile memory, removable storage and non-removable storage. Client 202 storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing machine-readable instructions. The client 202 can also include or have access to a computing environment that includes input, output, and a communication connections. The client 202 can operate in a networked environment using a communication connection to connect to one or more remote computers, such as database servers 212, 222, 224, intermediary server 210, and other network resources. The communication connection can include a Local Area Network (LAN), a Wide Area Network (WAN) or other networks.

Machine-readable instructions stored on a machine-readable medium are executable by the processing unit of the client 202. A hard drive, CD-ROM, and RAM are some examples of articles including a machine-readable medium. The term "machine-readable medium" is also used to represent carrier waves on which the software is transmitted. For example, a computer program capable of providing a generic technique to perform access control check for data access and/or for doing an operation on one of the servers in a component object model (COM) based system according to the teachings of the present invention may be included on a CD-ROM and loaded from the CD-ROM to a hard drive. The machine-readable instructions allow the client 202 to provide generic access controls in a COM, TCP/IP, Server Message Block ("SMB"), or other protocol based, or protocol-hybrid, network system having multiple users and servers.

One example document management system 220 stores documents in a document storage module 224 and indexes data describing documents in a document indexing database 222. In some embodiments, the document management system is Documentum. The document management system 220 stores documents and makes them available on the network through a document management system 220 interface.

In some embodiments, document indexing data stored in the document indexing database is stored in a hierarchical fashion. The hierarchical fashion can be facilitated by a hierarchical database, a relational database with data arranged in a hierarchical fashion, or other database that facilitates storage of hierarchical data. One such hierarchical storage structure includes a client at the top of the hierarchy with client account types under the client. Under a client account type are one or more accounts of that type. Under a client account are documents associated with that account. This hierarchical structure facilitates display of the document indexing data in a tree-view structure, or other hierarchical data display. Data from the hierarchical structure can then be retrieved from the document indexing database by layer, one layer, multiple layers, or all layers at a time.

One example intermediary server 210 is a server that provides computing services on the network 230. Some such computing services include application hosting services, SMB file sharing services, Common Internet File System ("CIFS") file sharing services, and other services and combinations of services. An example server 210 is JLAN Server version 3.4 available from Starlasoft.

In some embodiments, the intermediary server 210 services document management system 220 document indexing data requests from the client 202. The intermediary server 210, in some embodiments, accesses the document indexing data from the document indexing database 222 of the document management system 220. In other embodiments, the intermediary server 210 accesses the document indexing data from a document indexing database copy 212. After obtaining data requested by the client 202, the intermediary server, serves the requested data to the client 202. The document indexing data served to the client can be encoded according to a protocol, such as SMB, to cause the documents represented by the document indexing data to appear as documents available on a network drive.

In some embodiments, the client 202 receives the document indexing data from the intermediary server 210 and displays the data to a user within a user interface, such as user interface 100 of FIG. 1. In some embodiment, the user interface is a client 202 operating system user interface that displays the content of local or network drives, such as the Windows Explorer interface of Microsoft Windows operating systems.

In other embodiments, the user interface is presented within another client 202 program, such as Microsoft Outlook.

In some Outlook embodiments, such as embodiments utilizing Outlook 2002, the Integrated File Management ("IFM") functionality is leveraged. The IFM functionality allows users to follow a specific link added to Outlook to navigate the Windows File System and network share drives using Outlook. The specific link is directed to the intermediary server 210. This provides seamless integration of Outlook to the document management system 220 via the intermediary server 210.

In some other Outlook embodiments, such as embodiments utilizing Outlook 2003 which no longer includes the IFM functionality with the standard product, a folder homepage is used. The folder homepage within Outlook links to an HTML page on a file server or a web server. This HTML page utilizes a component that provides browser based local file system access. In one embodiment, the component is ShellView Pack 6.1 available from Sky Software (www.ssware.com).

In some other Outlook embodiments, the Microsoft Outlook interface provides functionality through the use of controls, plugins, or Microsoft Outlook enhancements. Such enhancements provide the ability to users to drag and drop files to and from the document management system 220, perform document searches, open documents, and other actions.

A client 202 user, in some embodiments, can select a document representation derived from the document indexing data in the user interface and access the document. In some embodiments, the document is retrieved directly from the document management system 220, such as directly from the document storage module 224. In some embodiments, the document is retrieved directly from location the document management system causes the document to be stored, wherein the location the document is stored is identified in the document indexing data the client received from the intermediary server.

Figure 3:
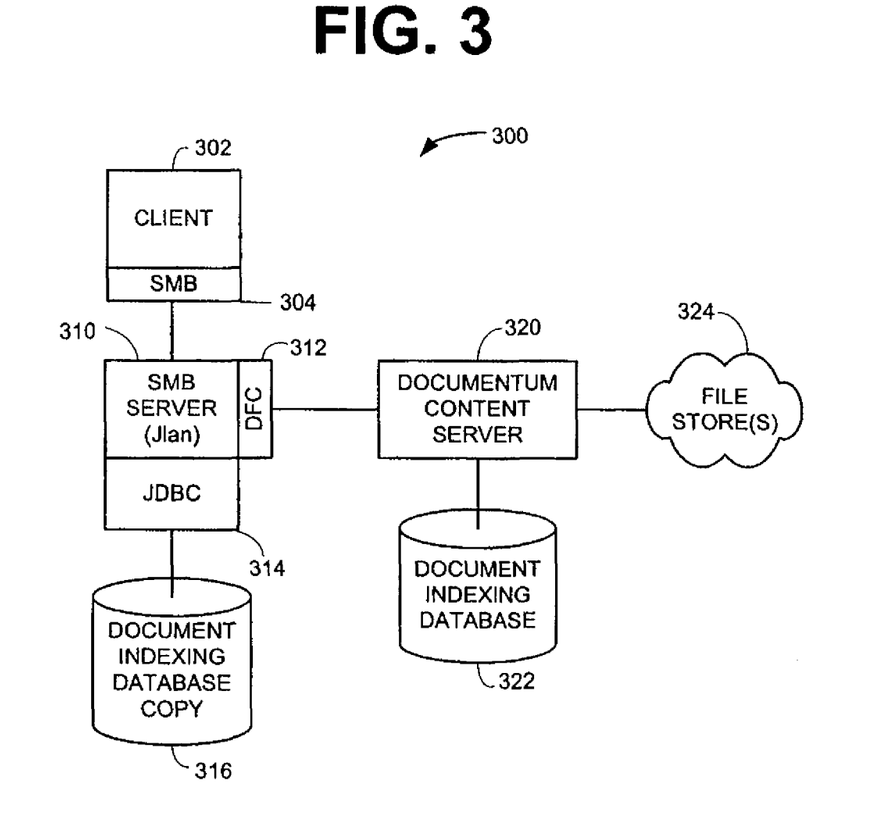
FIG. 3 is a schematic block diagram of a system according to an example embodiment.

FIG. 3 is a schematic block diagram of a system 300 according to an example embodiment. The system 300 includes a client 302, a JLAN SMB server 310, and a Documentum Content Server 320. This embodiment simplifies the Documentum user interface while preserving valuable document management functionality. This embodiment further minimizes, and can even eliminate, the need to load client 302 with any thick-client applications.

This example embodiment is established by having the JLAN SMB server 310 on a remote machine acting as a file share while modification of the JLAN SMB server 310 provides interaction with the Documentum Content Server 320. The JLAN SMB server 310 is Java based and, thus, can run on any platform with a Java runtime environment. This embodiment can provide capabilities including document versioning, browsing, and access, among other capabilities control through a simple client 302 user interface. The end user experience, while interacting with the Documentum Content Server 320, is the same as using a standard file share user interface.

In some embodiments, the client 302 is a Microsoft Windows client that supports one of the SMB Dialects supported by the JLAN SMB server 310. In some embodiments, this is all that is need for the client 302 to be operative within the system 300.

The JLAN SMB server 310 is an extensible Java based SMB server and can be run on any of multiple platforms. In some embodiments, the JLAN SMB server 310 is implemented behind a load-balancing/fail-over switch to provide load-balancing and/or failover robustness between multiple JLAN SMB servers 310.

In a typical JLAN SMB server, file operations such as openFile, closeFile, readFile, writeFile, treeOpen, treeClose, and other operations are mapped to a file system. The methods behind these operations in the JLAN SMB server 310 of the present system 310 embodiment are modified to make corresponding calls to DocBroker associated with the Documentum Content Server 320 using Java based Documentum Foundation Class ("DFC") 5.1.2 application programming interface 312. This results in a mapping between the file operations on the JLAN SMB server and the Documentum Content Server 320 and allows the client 302 to interact directly with Documentum.

The JLAN SMB server 310 accesses a document indexing database copy 316 via a database connectivity protocol, such as Java Data Base Connectivity ("JDBC"). The document indexing database copy 316 is a copy of all, or a portion of the document indexing database 322 associated with the Documentum Content Server 320. The JLAN SMB server 310 accesses the document indexing database 316 to retrieve document index data in response to a request from the client 302. This reduces latency in the document indexing database 322, can provide quicker client 302 access to the indexing data, and provides further benefits. The JLAN SMB server services the client 302 requests with the retrieved data.

In some embodiments, the document indexing data provided to the client 302 includes a handle to enable the client 302 to access documents represented in the retrieved document indexing data directly from a Documentum file store 324.

In some embodiments, a client 302 document index data request includes user, or client 302, data access credentials which are used by the SMB JLAN SMB server 310 to retrieve only documents the user or client 302 has access to. The use of these data access credentials, in some embodiments, further includes providing a user or the client 302 with read-only or other limited document privileges. These abilities provide functionality to embodiments that require documents to remain in a certain state, such as a quarterly statement maintained for historical purposes, or when certain users or clients do not have authority to perform certain actions with or to documents. In some embodiments, documents that are read-only, are displayed to on the client 302 under a root drive or folder in a tree-view structure indicating the documents are read-only. Further embodiments include displaying documents under a root drive or folder in a tree-view structure indicating the documents are editable. Folder and file names displayed on the client, in some such embodiments, provide context to documents displayed within folders and to actual documents via displayed file names. This quickly enables a client 302 user to visualize document properties.

A further result of providing the document index data to the client 302 through the JLAN SMB server 310 is that the client 302 can perform a document search using a standard client 302 operating system file search utility. In some embodiments, the client 302 includes a Microsoft Windows operating system and the document indexing data can be searched using the search utility within Windows Explorer.

Figure 4:
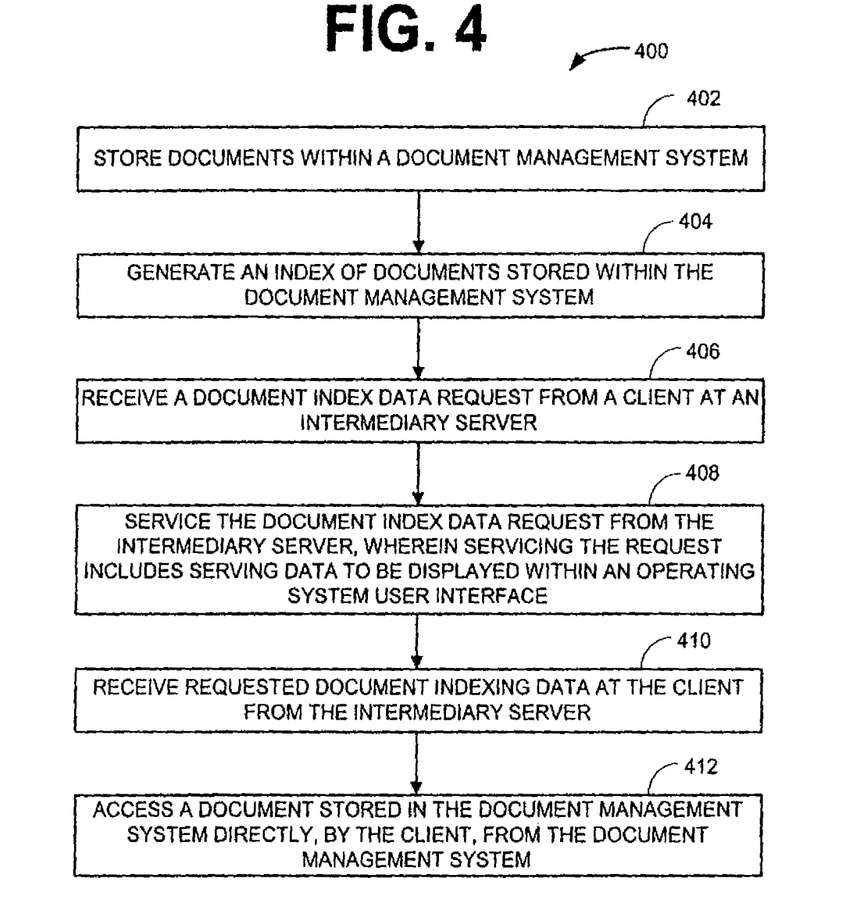
FIG. 4 is a block diagram of a method according to an example embodiment.

FIG. 4 is a block diagram of a method 400 according to an example embodiment. The method 400 is an example method performed by a system that provides clients access to documents stored in a document management system through an intermediary server.

In some embodiments, the example method 400 includes storing documents within a document management system 402 and generating an index of documents stored within the document management system 404. The method 400 further includes receiving a document index data request from a client at an intermediary server 406 and servicing the document index data request from the intermediary server 408, wherein servicing the request includes serving data to be displayed within an operating system user interface. Some embodiments of the method 400 further include maintaining a copy of the document index in a document indexing database outside of the document management system and accessible to the intermediary server and retrieving requested document indexing data from the document indexing database.

Yet further embodiments of the method include receiving requested document indexing data at the client from the intermediary server 410 and accessing, by the client, a document stored in the document management system directly from the document management system 412. In some embodiments, accessing the document directly from the document management system 412 includes accessing the document from a location where the document management system causes the document to be stored.

Figure 5:
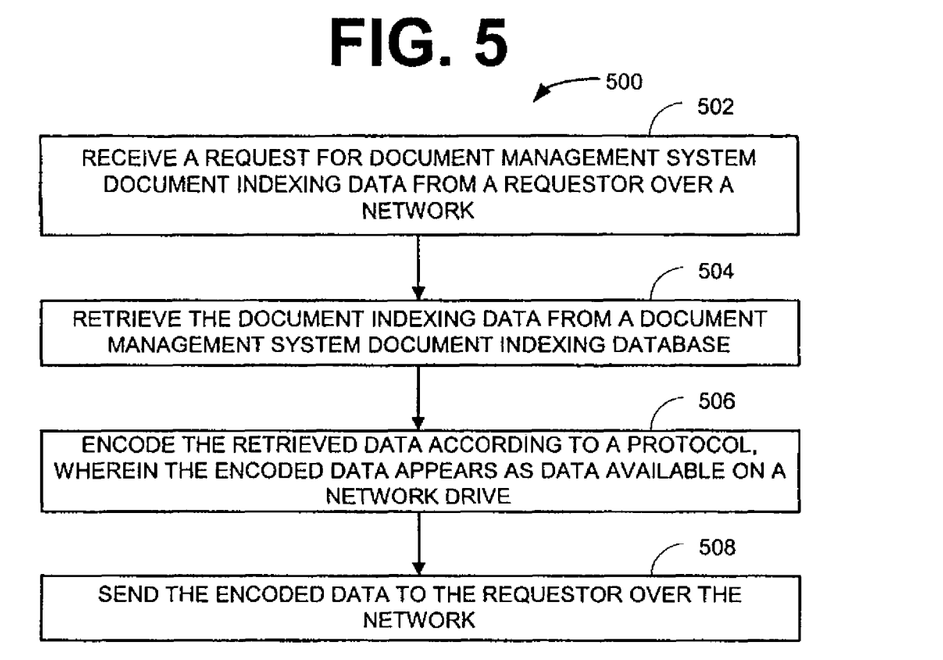
FIG. 5 is a block diagram of a method according to an example embodiment.

FIG. 5 is a block diagram of a method 500 according to an example embodiment. The method 500 is an example method performed by an intermediary server, such as intermediary server 210 of FIG. 2 or JLAN SMB server 310 of FIG. 3.

The method 500 includes receiving a request for document management system document indexing data from a requestor over a network 502 and retrieving the document indexing data from a document management system document indexing database 504. The method 500 further includes encoding the retrieved data according to a protocol 506, wherein the encoded data appears as data available on a network drive, and sending the encoded data to the requestor over the network 508.

In some embodiments, receiving a request for document management system document indexing data 502 includes receiving user credential data. In some such embodiments retrieving the document indexing data 504 includes retrieving the document indexing data 502 of documents to which the user credentials provide access privileges.

In some embodiments of the method 500, the network is the Internet. In various other embodiments, the network include one or more networks such as a local area network, a wide area network, a global network, a system area network, the Internet, and a public switched telephone network interconnecting two or more computing resources, and other networks capable of transporting data between computing resources.

Figure 6:
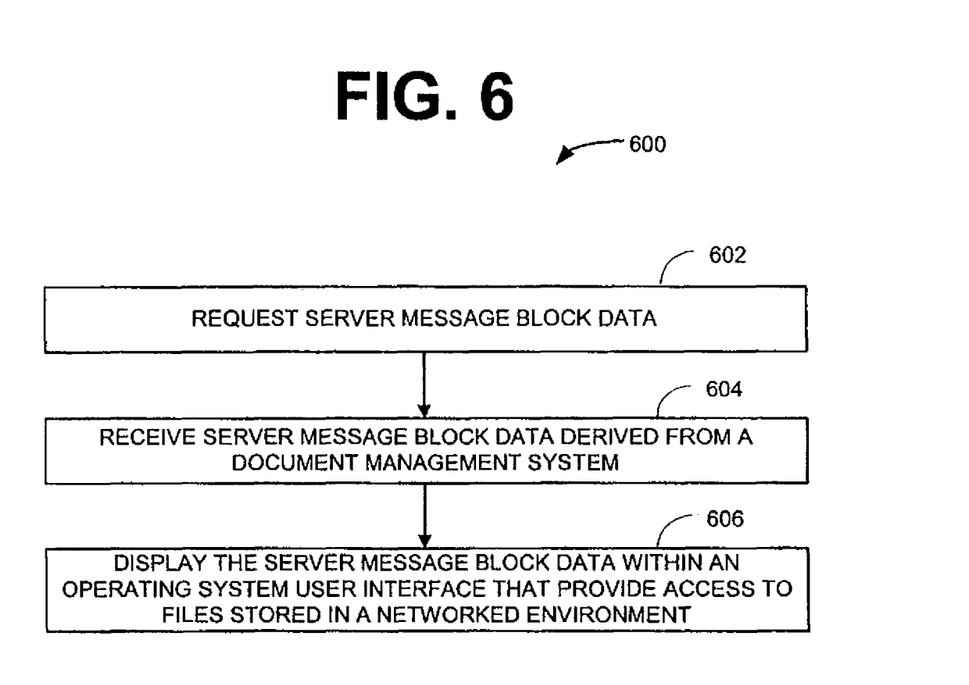
FIG. 6 is a block diagram of a method according to an example embodiment.

FIG. 6 is a block diagram of a method 600 according to an example embodiment. The method 600 is a method executed by a client to access documents stored in a document management system.

In some embodiments, the example method 600 includes receiving SMB data derived from a document management system index database 604 and displaying the SMB data within an operating system user interface that provides access to files stored in a networked environment 606. In some such embodiments, the SMB data provides a handle to a document stored by the document management system. In some embodiments, the method 600 includes requesting the SMB data 602. In some embodiments, the SMB data is requested 602 from the document management system. In other embodiments, the SMB data is requested 602 from a network resource other than the document management system, such as from an intermediary server.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. A computer implemented method comprising:
   receiving, via a computer including a processing unit, Server Message Block data through a Java SMB intermediary server from a document indexing database copy derived from a document management system index database stored within a document management system coupled to the computer, wherein the Server Message Block data comprises client data stored in a hierarchical fashion that includes a client atop of the client data hierarchy with client account types under the client, wherein included under the client account are documents, associated with the client account and account types associated with the client account, which are retrievable from a single layer of the hierarchal database;
   displaying the Server Message Block data within an operating system user interface of the computer in an expandable and contractible tree-view display of data that provides access to files stored in a networked environment coupled to the computer; and
   wherein the data provides a handle to a document stored by the document management system.

2. The method of claim 1, further comprising: receiving a request for the Server Message Block data.

3. The method of claim 2, wherein receiving a request for the Server Message Block data includes receiving one or more user data access credentials, further wherein receiving the Server Message Block data includes receiving only data to which the user data access credentials provides access to.

4. The method of claim 3, wherein receiving only data to which the data access credentials provides access to includes data representative of documents to which the user data access credential provide read-only access to.

5. The method of claim 2, wherein receiving the request for the Server Message Block data includes a request for a single hierarchy layer.

6. The method of claim 1, wherein the networked environment is a local area network.

7. The method of claim 1, wherein displaying the Sever Message Block data within the operating system user interface includes:
   wherein the tree-view display is representative of document indexing within the document management system.

8. A non-transitory machine-readable storage medium, with instructions thereon which when processed, result in a machine:
   receiving Server Message Block data through a Java SMB intermediary server from a document indexing database copy derived from a document indexing database derived from a document management system index database stored within a document management system, wherein the Server Message Block data comprises client data stored in a hierarchical fashion that includes a client atop of the client data hierarchy with client account types under the client, wherein included under the client account are documents, associated with the client account and account types associated with the client account, which are retrievable from a single layer of the hierarchal database;

displaying the Server Message Block data within an operating system user interface in an expandable and contractible tree-view display of data that provides access to files stored in a networked environment; and wherein the data provides a handle to a document stored by the document management system.

9. The machine-readable medium of claim 8, wherein the instructions when processed, further result in the machine receiving a request for the Server Message Block data.

10. The machine-readable medium of claim 9, wherein receiving the request for the Server Message Block data includes receiving one or more user data access credentials, further wherein receiving the Server Message Block data includes receiving only data to which the user data access credentials provides access to.

11. The machine-readable medium of claim 10, wherein receiving only data to which the data access credentials provides access to includes data representative of documents to which the user data access credential provide read-only access to.

12. The machine-readable medium of claim 8, wherein receiving the request for Server Message Block data includes receiving a request for a single hierarchy layer.

13. The machine-readable medium of claim 8, wherein the networked environment is a local area network.

14. The machine-readable medium of claim 8, wherein displaying the Sever Message Block data within an operating system user interface includes:

displaying the Server Message Block data in an expandable and contractible tree-view display of data, wherein the tree-view display is representative of document indexing within the document management system.

15. A system comprising:
a computer including a processing unit;
a data reception module to receive Server Message Block data through a Java SMB intermediary server from a document indexing database copy derived from a document management system index database stored within a document management system coupled to the computer, wherein the Server Message Block data comprises client data stored in a hierarchical fashion in a relational database that includes a client atop of the client data hierarchy with client account types under the client, wherein included under the client account are documents, associated with the client account and account types associated with the client account, which are retrievable from a single layer of the relational database;

a data display module to display the Server Message Block data within an operating system user interface in an expandable and contractible tree-view display of data that provides access to files stored in a networked environment coupled to the computer; and wherein the data provides a handle to a document stored by the document management system.

16. The system of claim 15, further comprising:
a data request module to receiving a request for the Server Message Block data.

17. The system of claim 16, wherein the Server Message Block data request received by the data request module includes one or more user data access credentials, further wherein the data reception module receives only the Server Message Block data to which the user data access credentials provides access to.

18. The system of claim 15, wherein receiving the request by the data request module for Server Message Block data includes a request for a single hierarchy layer.

19. The system of claim 15 wherein the networked environment is a local area network.

20. The system of claim 15, wherein the tree-view display is representative of document indexing within the document management system.

* * * * *